United States Patent
Jiang et al.

(10) Patent No.: US 8,942,147 B2
(45) Date of Patent: Jan. 27, 2015

(54) CLOSED LOOP TRANSMIT DIVERSITY IN CONTINUOUS PACKET CONNECTIVITY

(76) Inventors: Yibo Jiang, San Diego, CA (US); Sharad Deepak Sambhwani, San Diego, CA (US); Jilei Hou, Beijing (CN)

( * ) Notice: Subject to any disclaimer, the term of this patent is extended or adjusted under 35 U.S.C. 154(b) by 276 days.

(21) Appl. No.: 13/344,222

(22) Filed: Jan. 5, 2012

(65) Prior Publication Data

US 2013/0064181 A1    Mar. 14, 2013

Related U.S. Application Data

(60) Provisional application No. 61/431,436, filed on Jan. 11, 2011.

(51) Int. Cl.
- H04B 7/00 (2006.01)
- H04B 7/06 (2006.01)
- H04B 7/04 (2006.01)

(52) U.S. Cl.
CPC ............ *H04B 7/0658* (2013.01); *H04B 7/0617* (2013.01); *H04B 7/0413* (2013.01)
USPC .......................................................... 370/310

(58) Field of Classification Search
USPC .................. 370/310–349, 512–520
See application file for complete search history.

(56) References Cited

U.S. PATENT DOCUMENTS

| | | | |
|---|---|---|---|
| 6,754,473 B1 * | 6/2004 | Choi et al. ................... | 455/101 |
| 6,947,707 B2 | 9/2005 | Raghothaman | |
| 7,020,127 B2 * | 3/2006 | Iacono et al. ................. | 370/342 |
| 7,065,131 B2 * | 6/2006 | Bergel .......................... | 375/152 |
| 7,447,270 B1 | 11/2008 | Hottinen | |
| 7,499,709 B2 * | 3/2009 | Das et al. ...................... | 455/455 |
| 2004/0157643 A1 * | 8/2004 | Brandes et al. ............... | 455/561 |
| 2004/0171357 A1 * | 9/2004 | Lobinger et al. ............. | 455/101 |
| 2004/0180627 A1 * | 9/2004 | Dabak et al. ............... | 455/67.16 |
| 2004/0233872 A1 * | 11/2004 | Lobinger et al. ............. | 370/334 |
| 2008/0285667 A1 | 11/2008 | Mondal | |

(Continued)

OTHER PUBLICATIONS

"3rd Generation Partnership Project; Technical Specification Group Radio Access Network; Continuous connectivity for packet data users (Release 9)", 3GPP Standard; 3GPP TR 25.903, 3rd Generation Partnership Project (3GPP), Mobile Competence Centre ; 650, Route Deslucioles , F-06921 Sophia-Anti Polis Cedex; France, no. V9.0.0, Dec. 14, 2009, pp. 1-138, XP050400816, [retrieved on Dec. 14, 2009].

(Continued)

*Primary Examiner* — Kwang B Yao
*Assistant Examiner* — Juvena Loo
(74) *Attorney, Agent, or Firm* — Darren M. Simon

(57) ABSTRACT

Apparatus and methods for communicating in a wireless network include receiving a weight vector in a slot for providing closed loop transmit diversity to signals in a next slot, holding the weight vector over a plurality of slots following a transmission burst, and applying the weight vector to signals in at least one slot of a subsequent transmission burst in discontinuous transmit. Additional apparatus and methods for communicating in a wireless network include determining a weight vector based on signals received from a device to provide closed loop transmit diversity feedback to the device, holding the weight vector over a plurality of slots following receiving a transmission burst, and applying the weight vector for signals received in at least one slot of a subsequent transmission burst from the device.

24 Claims, 11 Drawing Sheets

(56) References Cited

U.S. PATENT DOCUMENTS

2008/0298317 A1    12/2008  Yang
2010/0246516 A1     9/2010  Pelletier
2011/0080972 A1*    4/2011  Xi et al. .................. 375/267

OTHER PUBLICATIONS

Ericsson et al: "Closed loop transmit diversity for HSUPA". 3GPP Draft; R1-105475 Closed Loop Transmit Divesity for HSUPA, 3rd Generation Partnership Project (3GPP), Mobile Competence Centre; 650, Route Des Lucioles; F-06921 Sophia-Anti Polis Cedex; France, vol. RAN WG1, no. X i 'an; 20101011, Oct. 6, 2010, XP050450743, [ retrieved on Oct. 6, 2010].

International Search Report and Written Opinion—PCT/US2012/020990—ISA/EPO—Mar. 21, 2012.

"R1-110120 Interaction of CPC and Closed Loop ULTD" TSG RAN#63bis. Jan. 10, 2011, XP55021515 Retrieved from the Internet: URL:http://list.etsi.org/scrips/wa.exeA2=ind1101b&L=3gpp tsg ran wg1&T=O&P=2572 [retrieved on Mar. 9, 2012].

* cited by examiner

CLOSED LOOP TRANSMIT DIVERSITY IN CONTINUOUS PACKET CONNECTIVITY

CLAIM OF PRIORITY UNDER 35 U.S.C. §119

The present application for patent claims priority to Provisional Application No. 61/431,436 entitled "Closed Loop Transmit Diversity in Continuous Packet Connectivity" filed Jan. 11, 2011, and assigned to the assignee hereof and hereby expressly incorporated by reference herein.

BACKGROUND

1. Field

Aspects of the present disclosure relate generally to wireless communication systems, and more particularly, to providing closed loop transmit diversity.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA) and similar derivatives, which provide higher data transfer speeds and capacity to associated UMTS networks.

In addition, HSPA protocols can allow devices to communicate in a continuous packet connectivity (CPC) mode to improve overall network performance. For example, as part of operating in CPC mode, devices can implement discontinuous transmission (DTX) at least in part by refraining from transmitting control data to a base station and/or powering off a transmitter where there is no such data to transmit. Similarly, devices can implement discontinuous receive (DRX) at least in part by powering off a receiver when no data is to be received from the base station. CPC mode can conserve network resources, improve power consumption at the device, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for communicating in a wireless network includes receiving a weight vector in a slot for providing closed loop transmit diversity to signals in a next slot. Further, the method includes holding the weight vector over a plurality of slots following a transmission burst. Additionally, the method includes applying the weight vector to signals in at least one slot of a subsequent transmission burst in discontinuous transmit.

In another aspect, a computer program product includes a computer-readable medium having a plurality of code. The computer program product includes code for receiving a weight vector in a slot for providing closed loop transmit diversity to signals in a next slot. Further, the computer program product includes code for holding the weight vector over a plurality of slots following a transmission burst. Additionally, the computer program product includes code for applying the weight vector to signals in at least one slot of a subsequent transmission burst in discontinuous transmit.

In a further aspect, an apparatus for high speed packet access includes at least one processor and a memory coupled to the at least one processor. The at least one processor is configured to receive a weight vector in a slot for providing closed loop transmit diversity to signals in a next slot. Further, the at least one processor is configured to hold the weight vector over a plurality of slots following a transmission burst. Additionally, the at least one processor is configured to apply the weight vector to signals in at least one slot of a subsequent transmission burst in discontinuous transmit.

In an additional aspect, an apparatus operable in a wireless communication system includes means for receiving a weight vector in a slot for providing closed loop transmit diversity to signals in a next slot of a transmission burst. Further, the apparatus includes means for applying the weight vector for signals in at least one slot of a subsequent transmission burst in discontinuous transmit, wherein the means for applying holds the weight vector over a plurality of slots following the transmission burst. Additionally, the apparatus includes means for transmitting the signals having the weight vector applied.

In an aspect, a method for communicating in a wireless network includes determining a weight vector based on signals received from a device to provide closed loop transmit diversity feedback to the device. Further, the method includes holding the weight vector over a plurality of slots following receiving a transmission burst. Additionally, the method includes applying the weight vector to signals received in at least one slot of a subsequent transmission burst from the device.

In another aspect, a computer program product includes a computer-readable medium having a plurality of codes. The computer program product includes code for determining a weight vector based on signals received from a device to provide closed loop transmit diversity feedback to the device. Further, the computer program product includes code for holding the weight vector over a plurality of slots following receiving a transmission burst. Additionally, the computer program product includes code for applying the weight vector for signals received in at least one slot of a subsequent transmission burst from the device.

In a further aspect, an apparatus for high speed packet access includes at least one processor and a memory coupled to the at least one processor. The at least one processor is configured to determine a weight vector based on signals received from a device to provide closed loop transmit diversity feedback to the device. Further, the at least one processor is configured to hold the weight vector over a plurality of slots following receiving a transmission burst. Additionally, the at least one processor is configured to apply the weight vector for signals received in at least one slot of a subsequent transmission burst from the device.

In an additional aspect, an apparatus operable in a wireless communication system includes means for receiving signals from a device in a plurality of slots related to a transmission burst. Further, the apparatus includes means for determining a weight vector based on the signals received from the device at least one of the plurality of slots to provide closed loop transmit diversity feedback to the device. Additionally, the apparatus includes means for applying the weight vector for signals received in at least one slot of a subsequent transmission burst from the device, wherein the means for applying holds the weight vector over a different plurality of slots following the transmission burst.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
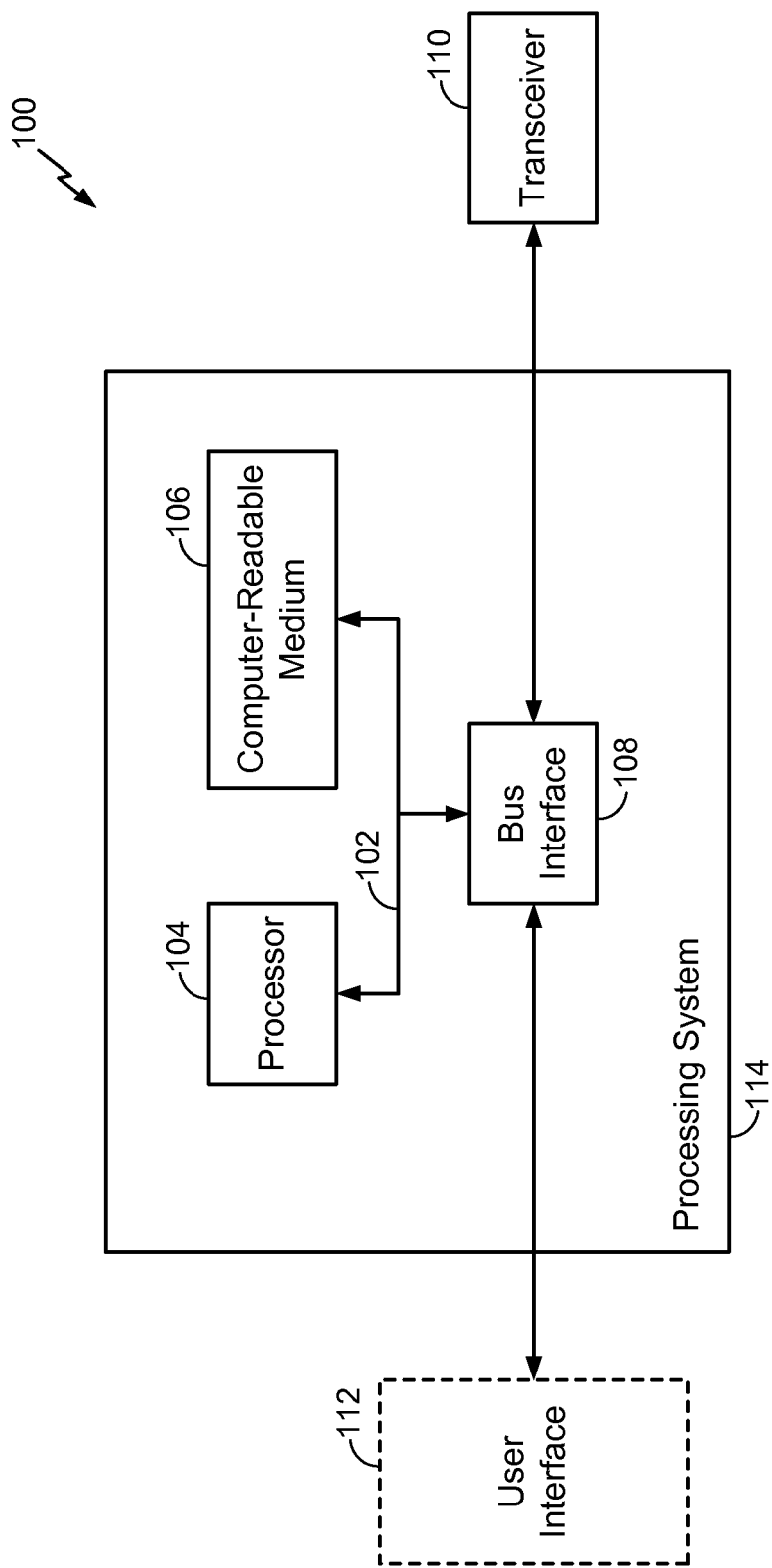
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described in this document, e.g. related to determining a weight vector and/or holding and applying a previously received weight vector for subsequent transmissions in a closed loop transmit diversity scheme, for any particular apparatus, such as a user equipment or a Node B. The computer-readable medium 106 may also be used for storing data that is manipulated by the processor 104 when executing software.

Figure 2:
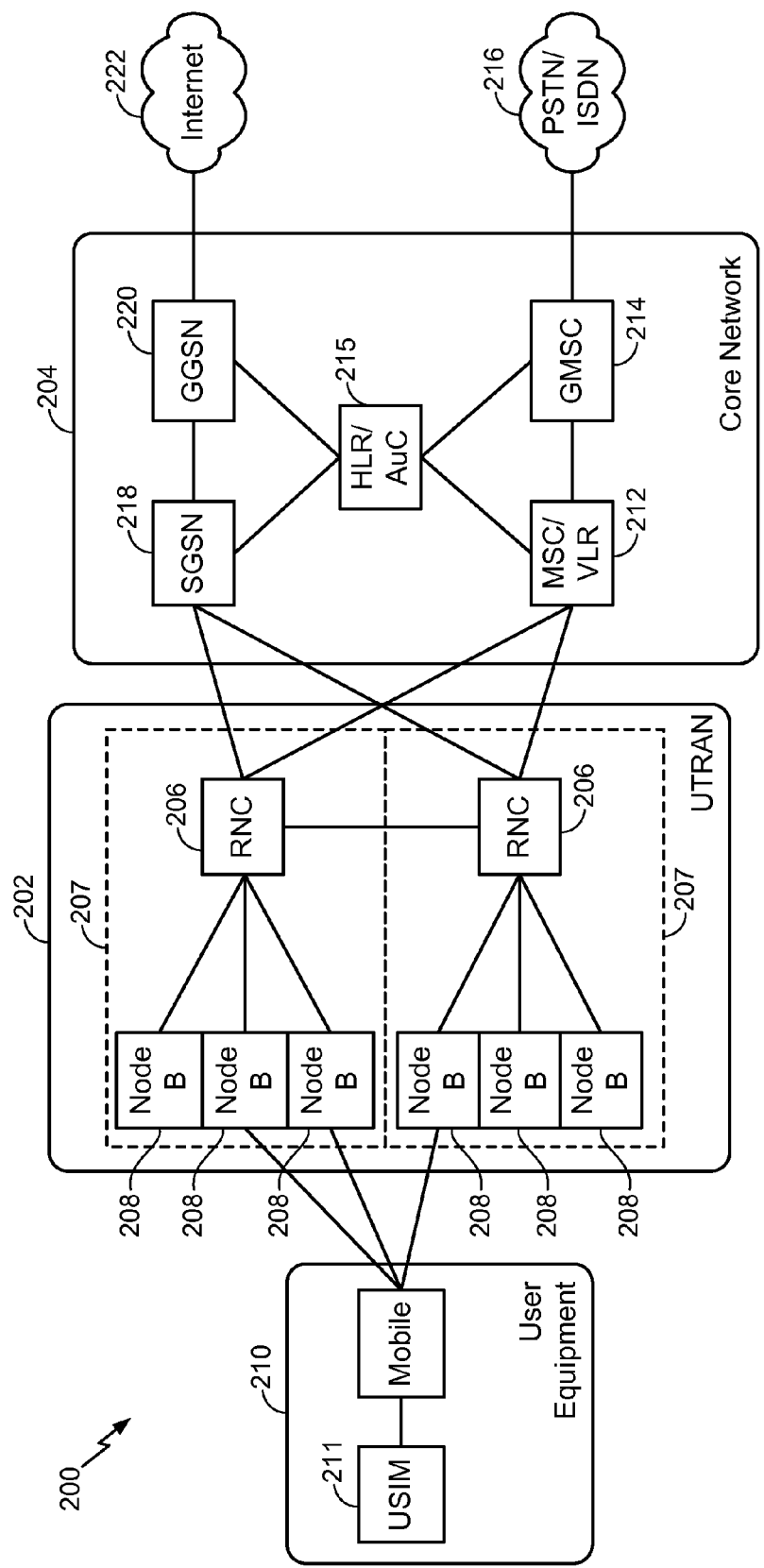
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information described herein utilizes terminology introduced in Radio Resource Control (RRC) Protocol Specification, 3GPP TS 25.331 v9.1.0, incorporated herein by reference.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), evolved Node B (eNB), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

As described in more detail below, the UE 210 and Node Bs 208 may be specially programmed or otherwise configured to perform the various functions described in this document, e.g. related to determining a weight vector and/or holding and applying a previously received weight vector for subsequent transmissions in a closed loop transmit diversity scheme.

Figure 3:
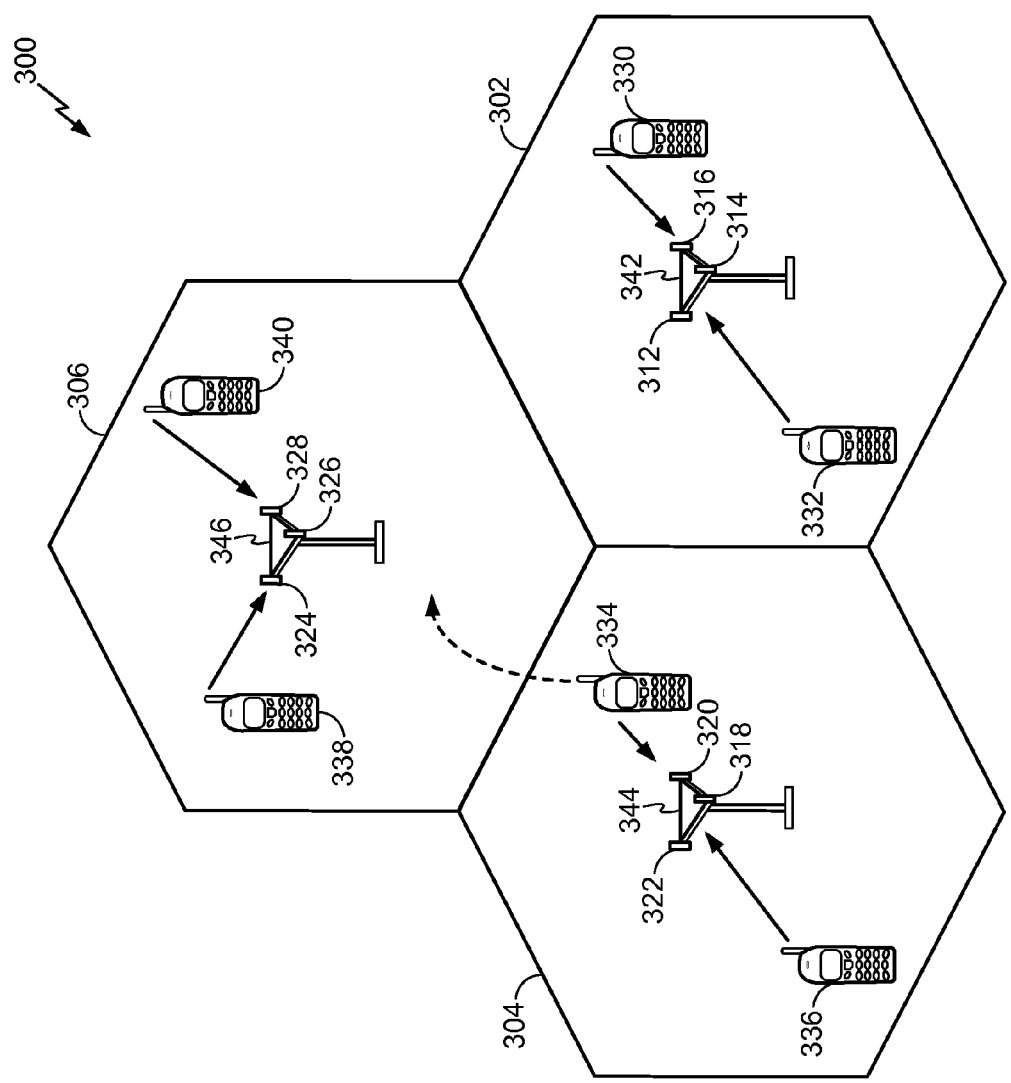
FIG. 3 is a conceptual diagram illustrating an example of an access network.

Referring to FIG. 3, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a core network 204 (see FIG. 2) for all the UEs 330, 332, 334, 336, 338, 340 in the respective cells 302, 304, and 306.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell.

Management of the handover procedure may take place at the UE 334, at the Node Bs corresponding to the respective cells, at a radio network controller 206 (see FIG. 2), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

As described in more detail below, one or more of the UEs 330, 332, 334, 336, 338, 340 and a corresponding one or more of the Node Bs 342, 344, 346 may be specially programmed or otherwise configured to perform the various functions described in this document, e.g. related to determining a weight vector and/or holding and applying a previously received weight vector for subsequent transmissions in a closed loop transmit diversity scheme.

Figure 4:
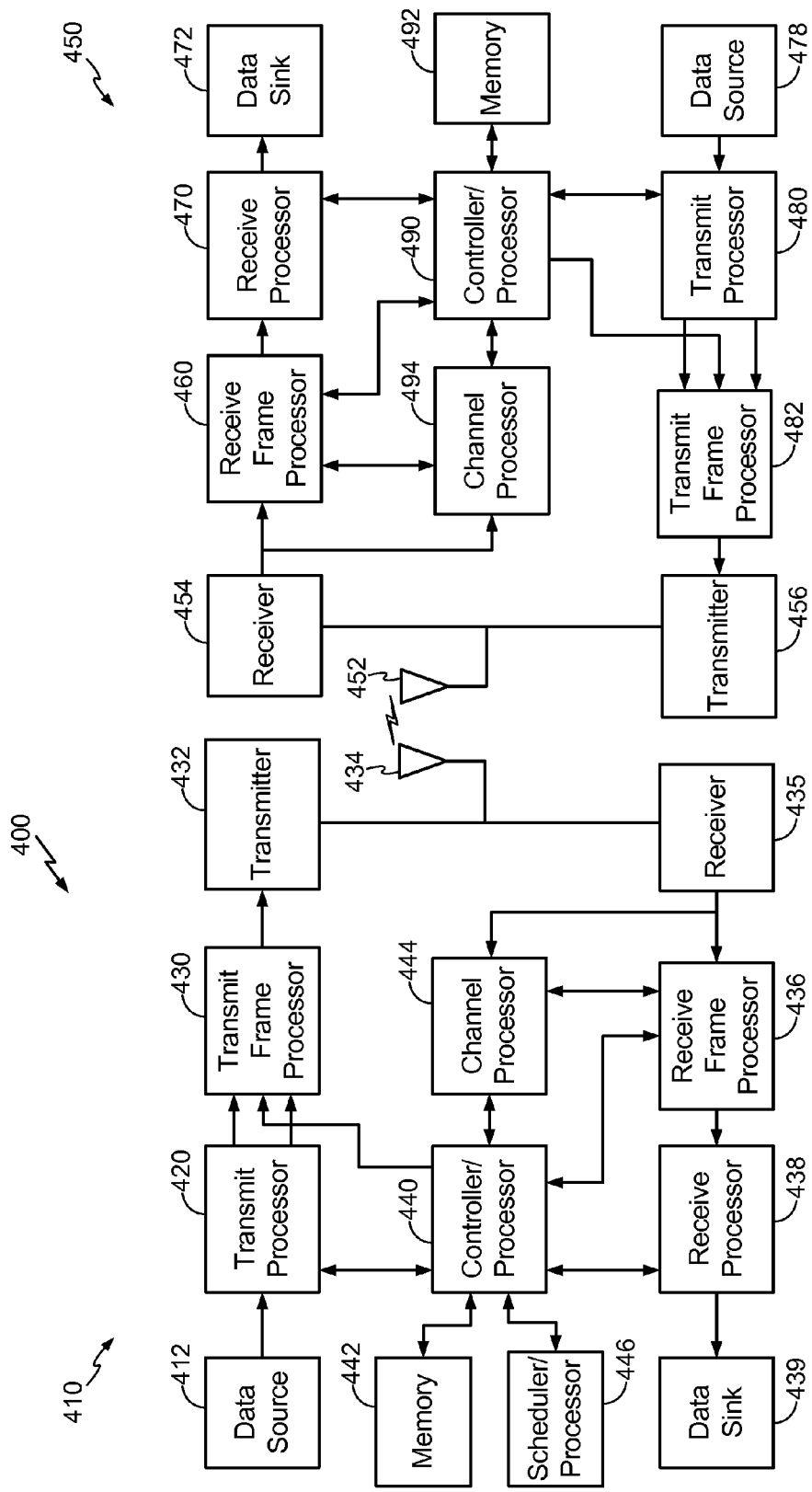
FIG. 4 is a block diagram conceptually illustrating an example of a Node B in communication with a UE in a telecommunications system.

FIG. 4 is a block diagram of a Node B 410 in communication with a UE 450, where the Node B 410 may be the Node B 208 in FIG. 2, and the UE 450 may be the UE 210 in FIG. 2. Node B 410 and UE 450 may be specially programmed or otherwise configured to perform the various functions described in this document, e.g. related to determining a weight vector and/or holding and applying a previously received weight vector for subsequent transmissions in a closed loop transmit diversity scheme. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames.

The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

According to aspects described herein, a UMTS network can support high speed packet access (HSPA) protocols, which can include HSPA+, high speed uplink packet access (HSUPA), high speed downlink packet access (HSDPA), etc. Moreover, devices communicating in the UMTS network can utilize closed loop transmit diversity (CLTD) for transmitting signals over multiple antennas, which can be received over a plurality of antennas at a base station. For example, this can include applying a weigh vector to signals transmitted over different antennas to allow coherent combination at the base station, where the weight vector can be based on feedback from the base station regarding a previous transmission of the device, specified by the base station based on previous transmissions from the device, and/or the like. Moreover, the weight vector can include a plurality of elements or components corresponding to the multiple antennas of the device.

In addition, devices can communicate with the base station in continuous packet connectivity (CPC) mode to improve network performance, which can include devices transmitting signals using DTX. For example, a device can utilize a DTX cycle of ¼, or ⅛, etc., respectively meaning the device can transmit pilots, data, control data, etc., every 4 or 8 sets of slots. In one example, the sets of slots can relate to 3 slots that comprise a 2 millisecond time transmit interval (TTI). For a given DTX cycle, as described further herein, a device can hold a CLTD weight vector received from a base station for a subsequent transmission burst. The related base station can also hold the CLTD weight vector for applying CLTD processing to the subsequent transmission burst. In one example, a method of CLTD can be provided for transmitting from the UE on the uplink on multiple (M>1) transmit antennas, including sending M pilot channels from the UE on the uplink. Further, in this example, for a base station having N receive antennas, the base station determines a CLTD weight vector from the pilot channels and sends weight vector feedback information on the downlink to the UE. Thus, in this example, the UE holds the last received weight vector to use for the initial D slots of a next burst of an uplink transmission, where D is the total CLTD processing and feedback delay, and the base station similarly holds the weight vector for its CLTD processing.

Figure 5:
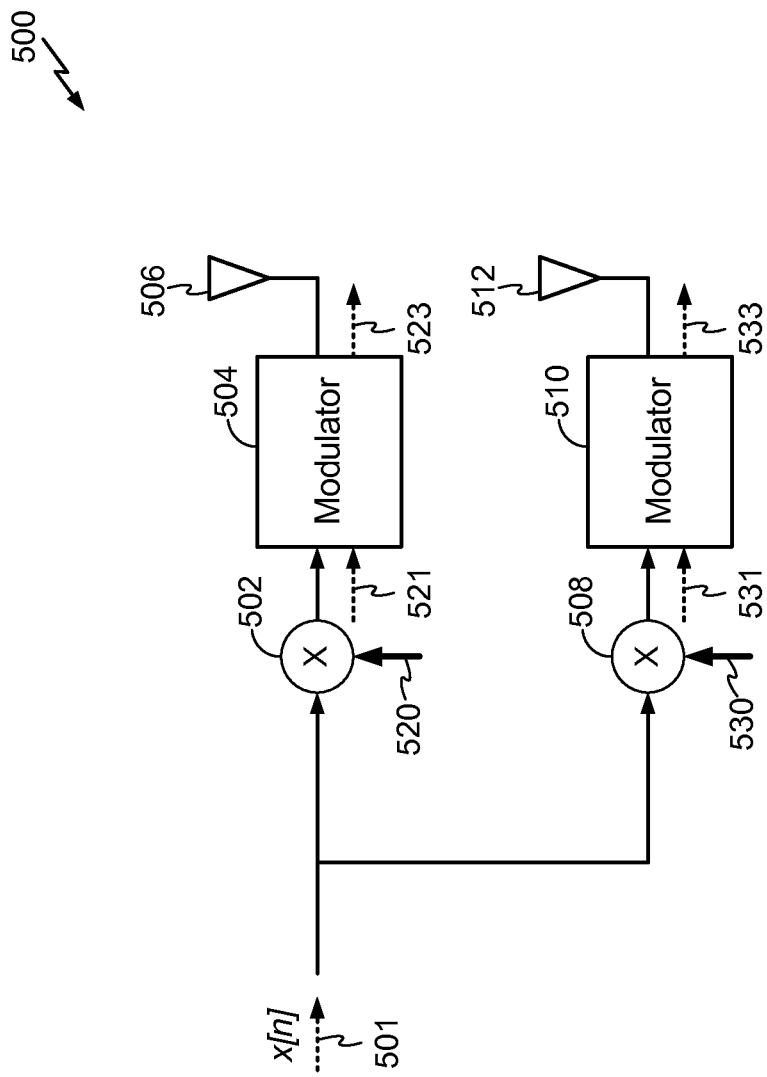
FIG. 5 is a system for applying weight vectors to a signal for transmission over multiple transmit antennas.

FIG. 5 illustrates a block diagram of an example system 500, e.g. a system included in or in communication with a transmit component of a UE, for applying a weight vector received from a base station to a signal 501 to provide CLTD. System 500 includes multiplier 502 that applies one or more components 520 of a CLTD weight vector to received signal 501, a modulator 504 that modulates the weighted signal 521 according to one or more modulation schemes, and a transmit antenna 506 for transmitting the modulated signal 523. System 500 similarly includes another multiplier 508 that applies one or more separate components 530, e.g. different from one or more components 520, of the CLTD weight vector to the signal 501, a modulator 510 for applying a modulation scheme to the weighted signal 531, and a transmit antenna 512 for transmitting the modulated signal 533. In one example, multipliers 502 and 508 and modulators 504 and 510 can be implemented within one or more transmit processors, coupled to one or more transmit processors, and/or the like, as described previously.

In one specific example, multiplier 502 can apply a weight vector component 520, such as $a_1[n]e^{j\theta_1[n]}$, to signal 501 $x[n]$, and multiplier 508 can apply a separate weight vector component 530, such as $a_2[n]e^{j\theta_2[n]}$ to the signal 501 to provide transmit diversity, where $a_1$ and $a_2$ are constants that can relate to power allocations among the transmit antennas 506 and 512, $[n]$ is a slot index, $\theta_1$ and $\theta_2$ are phases for the signals, and $j$ is an imaginary number. The modulated, weighted signals 523, 533 transmitted over antennas 506 and 512 can be received over multiple antennas at a base station and processed using the weight vectors. Thus, in one example, the base station can specify the weight vector as feedback for CLTD, as described further herein, and multipliers 502 and 508 can apply previously specified weight vectors to a signal.

Figure 6:
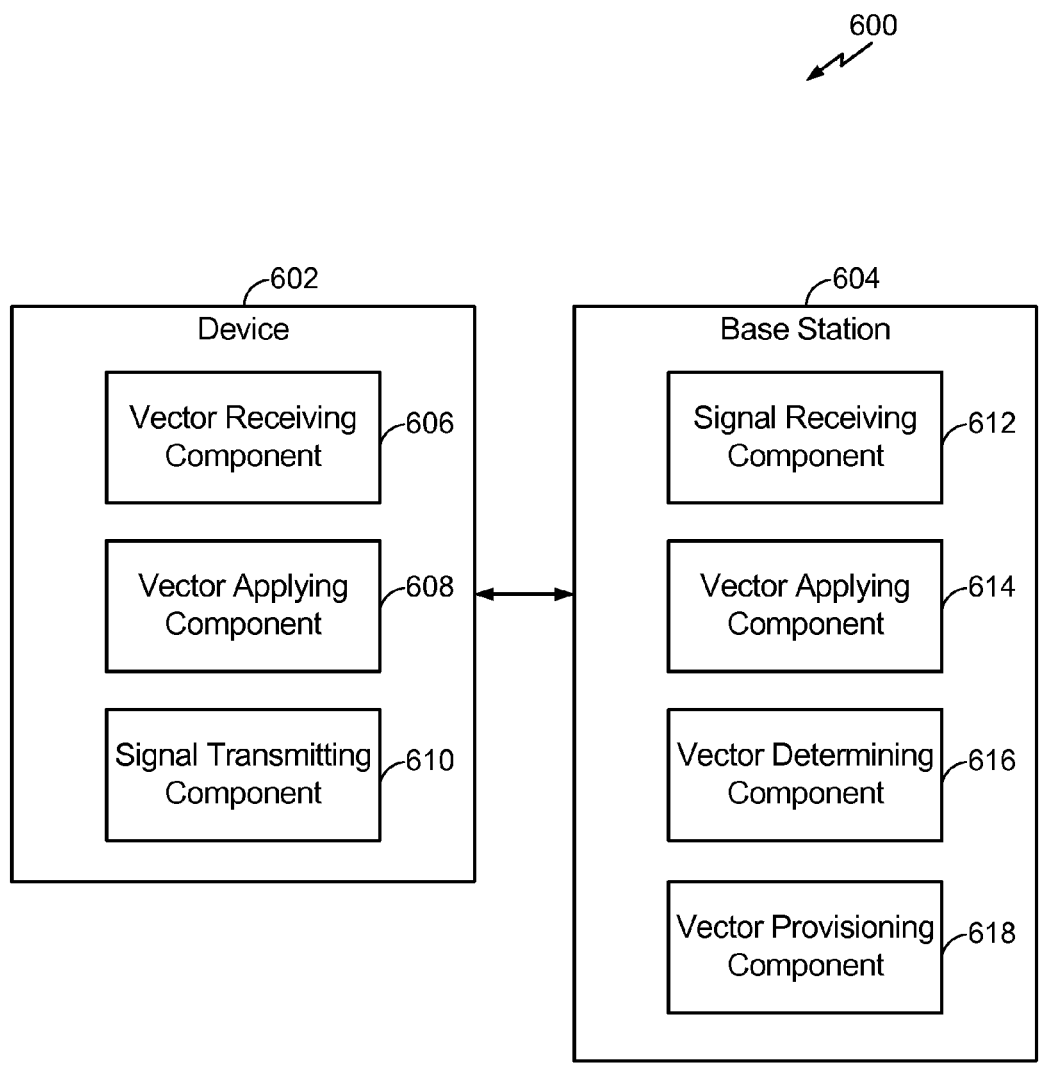
FIG. 6 is an example system for communicating and utilizing weight vectors for providing closed loop transmit diversity (CLTD).

FIG. 6 illustrates an example system 600 that facilitates transmitting signals using transmit diversity. System 600 comprises a device 602 that communicates with a base station 604 to receive access to a wireless network. Device 602 can be a UE, modem (or other tethered device), a portion thereof, and/or the like. Base station 604 can be a macrocell, femtocell, picocell, or similar base station, a relay node, mobile base station, a device communicating in peer-to-peer or ad-hoc mode (e.g., with device 602), a portion thereof, and/or the like. In one example, device 602 and base station 604 can communicate in a UMTS network, which can utilize an HSPA protocol, and/or the like. In this regard, for example, device 602 and base station 604 can define a frame structure, as described, which can include a number of TTIs, a number of slots, and/or the like. In a specific example, the frame structure can comprise number of TTIs that can be 2 milliseconds in time and include 3 slots.

Device 602 can comprise a vector receiving component 606 for obtaining a weight vector from a base station, a vector applying component 608 for multiplying the weight vector to a signal for transmission over a plurality of antennas to provide CLTD, and a signal transmitting component 610 for transmitting the signals with applied weights from the weight vector. Base station 604 can comprise a signal receiving component 612 for obtaining signals from a device, and a vector applying component 614 for utilizing one or more previously provisioned vectors to process the obtained signals. Base station 604 also comprises a vector determining component 616 for computing one or more weight vectors as feedback for the obtained signals to optimize signals transmitted by device 602 in a subsequent slot, and a vector provisioning component 618 for providing the one or more vectors to the device 602 and/or to vector applying component 614.

According to an example, device 602 can comprise multiple transmit antennas (not shown), and can communicate with base station 604 using a transmit diversity scheme, such as CLTD based on feedback from the base station 604. In addition, device 602 can communicate with base station 604 in CPC mode using DTX. As described, for example, this can include utilizing one or more transmission cycles to effectuate DTX, where device 602 transmits pilot and/or other data or control data channels over signals in a plurality of consecutive slots. Signal receiving component 612 can obtain the pilots and/or other data or control channels over the slots.

In one example, vector provisioning component 618 can have provided a weight vector to device 602 for applying CLTD to the signals, and vector applying component 608 can have applied the weight vector to a signal. Thus, vector applying component 614 can utilize the provided weight vector in processing and/or decoding the signals. In another example, vector applying component 608 can have applied a default or initial weight vector to the signals (e.g., based on not yet receiving weight vector feedback from base station 604). Based at least in part on the signals as received, vector determining component 616 can compute a weight vector for device 602 to apply to subsequent signals transmitted over device 602 antennas. The weight vector computed by vector determining component 616 can include a component or element for each transmit antenna utilized by device 602 in transmitting in CLTD mode. Vector determining component 616 can compute the weight vector or estimate weight vector components, according to the principle of signal-to-noise ratio maximization for received signal power, based on processed signals to improve a next signal from the device. As noted above, in one specific example using two antenna, vector determining component 616 can compute a first weight vector element or component according to the equation $a_1[n]e^{j\theta_1[n]}$, and a second weight vector element or component according to the equation $a_2[n]e^{j\theta_2[n]}$, where $a_1$ and $a_2$ are constants that can relate to power allocations among the transmit antennas (e.g., where the sum of the squares of $a_1$ and $a_2$ are equal to one), [n] is a slot index, $\theta_1$ and $\theta_2$ are phases for the signals, and j is an imaginary number (square root of −1). Vector provisioning component 618, in this example, can communicate the weight vector to device 602 (and/or to vector applying component 614 for subsequently applying to signals received from device 602).

It is to be appreciated that there can be some delay between signal receiving component 612 obtaining signals from a device, and vector receiving component 606 obtaining the weight vector as feedback for applying to subsequent signals transmitted to base station 604. For example, following a transmission burst by signal transmitting component 610, vector receiving component 606 can continue to receive weight vectors as feedback for the burst in subsequent slots. Vector applying component 608 can, in this example, store a last received weight vector for applying to signals of a subsequent transmission burst until a new weight vector is received as feedback for one or more slots of the subsequent transmission burst.

In a specific example, using DTX cycle of ¼ for example, signal transmitting component 610 can transmit 6 consecutive slots of pilot signal out of 12 available slots. In addition, within the 6 slots, signal transmitting component 610 can transmit data and/or other control channels within 3 of the slots. For each signal in a given slot, vector applying component 608 can multiply a signal by a weight vector received at vector receiving component 606 to apply CLTD. Thus, signal receiving component 612 can obtain signals in a given slot, vector applying component 614 can use a previously provided weight vector to process the signals, and vector determining component 616 can generate an additional weight vector for subsequent signals. Vector provisioning component 618 can provide the additional weight vector to device 602 (and/or vector applying component 614 for applying to signals received from device 602). Vector receiving component 606 can obtain the additional weight vector in a later slot due to delay in processing/transmitting the weight vector, vector applying component 608 can apply the additional weight vector in the next slot, and signal transmitting component 610 can transmit one or more signals having the weight vector applied.

In an example, vector receiving component 606 can obtain in a later slot, e.g. slot 8 or another subsequent slot depending on base station processing, feedback, and/or propagation delays, a weight vector related to previously transmitted signals in an earlier slot, e.g. slot 6. The next transmission burst may not begin until another later slot, e.g. slot 13, for DTX cycle ¼. Thus, vector applying component 608 can hold the last received weight vector (e.g. received at slot 8) computed at the base station based on the signal from slot 6 for applying to signals of the next transmission burst beginning in slot 13. Vector applying component 608 can continue applying the last received weight vector to signals of the next transmission burst until a new weight vector is received. In one example, vector receiving component 606 can obtain in slot 15 a new weight vector from vector provisioning component 618 for applying to the next transmission burst. Thus, in this example, vector applying component 608 applies the last received weight vector (received at slot 8 and computed at the base station based on the signal from slot 6) for signals of the transmission burst in slots 13, 14, and 15, while applying the new weight vector received in slot 15 to the signals of the transmission burst in slot 16 and beyond.

Similarly, for example, vector applying component 614 can hold the last transmitted weight vector for applying to signals received in a subsequent transmission burst until providing a new weight vector to the device 602. Thus, for example, vector applying component 614 can hold the weight vector based on a transmission received in slot 6 by signal receiving component 612 (e.g., which vector determining component 616 can determine in slot 8 due to delay, as described) based at least in part on not receiving signals in subsequent slot 7, not receiving another weight vector from vector provisioning component 618 in a subsequent slot, or otherwise determining an end of transmission burst from device 602. Signal receiving component 612 can obtain signals from device 602 in a subsequent slot (e.g., slot 13 in DTX cycle ¼) of a new transmission burst, and vector applying component 614 can utilize the weight vector based on the transmission received in slot 6 to process the signals. Vector applying component 614 can continue utilizing the weight vector based on the transmission received in slot 6 until vector provisioning component 618 provides a new weight vector to vector applying component 614. In this regard, device 602 and base station 604 can utilize similar weight vectors in transmitting and processing signals. Though shown as related to uplink communications from device 602 to base station

604, it is to be appreciated that similar functionalities can be additionally or alternatively applied to downlink transmissions in other examples.

Figure 7:
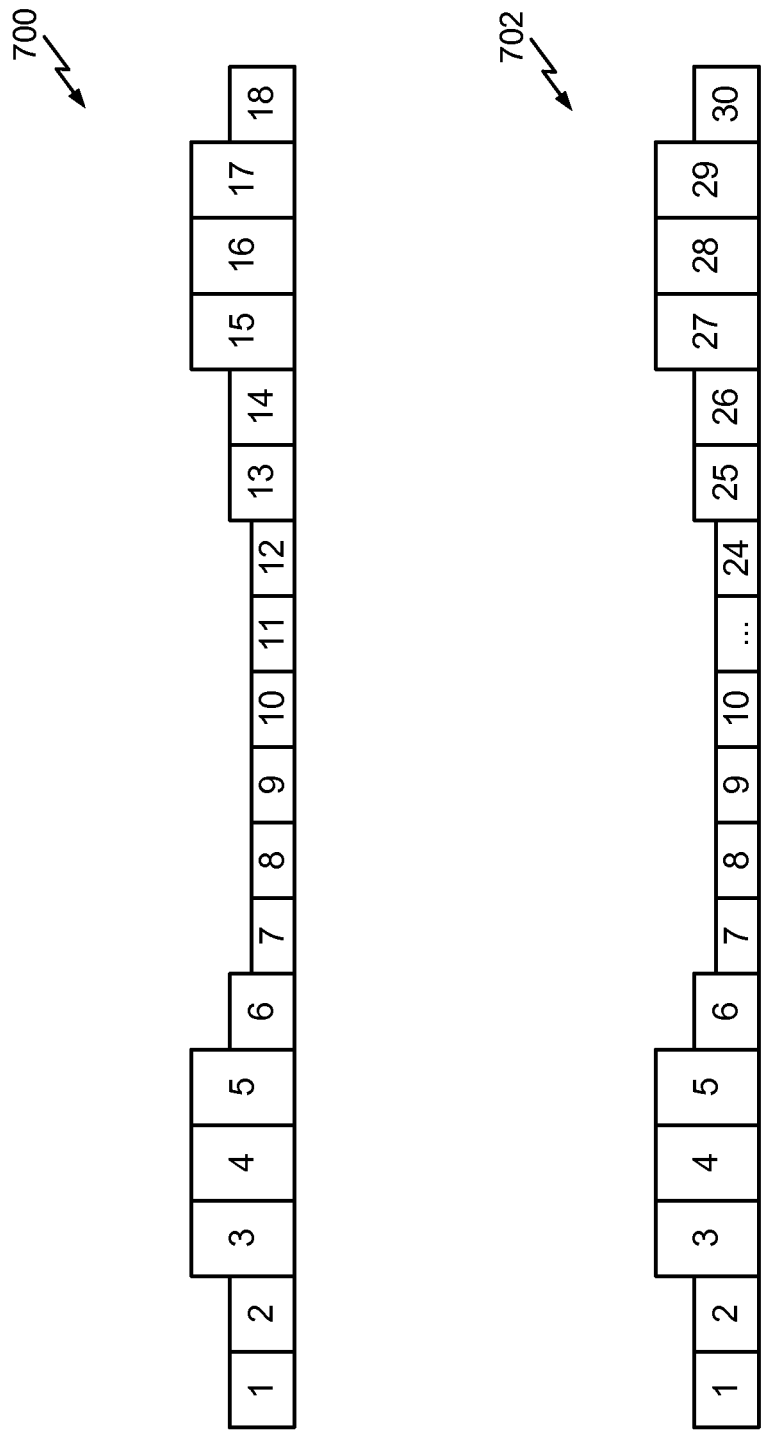
FIG. 7 shows example discontinuous transmit (DTX) cycles for describing certain aspects.

FIG. 7 depicts example DTX cycles 700 and 702 to further explain examples for utilizing weight vectors. DTX cycle 700 can represent a number of slots related to a cycle of ¼ such that a device transmits every 4 sets of slots, where a set can include 3 slots (e.g. the 3 slots corresponding to a 2 ms transmission time interval (TTI)). The device transmits pilot signals over slots 1 through 6, and also transmits other data and/or control channels over slots 3 through 5. For each slot, as described, the device can transmit related signals over multiple antennas using a weight vector for each antenna received from base station as feedback for transmissions in one or more previous slots. As described, there can be some delay between transmissions and receiving related weight vectors such that for the signals transmitted in slot 1, the device can receive in slot 3 a corresponding weight vector, computed at the base station based on the signals from slot 1. Thus, the device applies the received weight vector to signals in slot 4. Similarly, for the last slot of the transmission burst, e.g. slot 6, the device can receive in slot 8 a weight vector computed at the base station based on signals from slot 6.

In this regard, the device and base station can hold the last weight vector based on signals from slot 6 for applying to signals transmitted in one or more slots in a subsequent transmission burst. The device can begin the subsequent transmission burst by transmitting pilot signals in slot 13. The device can use the last weight vector held from slot 8 to provide CLTD for the pilot signals transmitted in slot 13, as well as signals in slots 14, 15, and so on, until the device receives a new weight vector from the base station. For example, the base station can compute the new weight vector based at least in part on the pilot signals received in slot 13, and the device can receive the new weight vector in slot 15, in one example due to delay. Thus, in slot 16, in this example, the device can apply the new weight vector to the signals transmitted in the slot, and so on. Similarly, the base station can utilize the last weight vector for applying to the signals received from the device in slot 13, 14, 15, etc., until base station sends the new weight vector to the device.

In another example, DTX cycle 702 can relate to a cycle of ⅛ where the device transmits pilot signals in slots 1 through 6 along with data and/or other control channels in slots 3 through 5. The device can then refrain from transmitting (and/or switch off a transmitter) until slot 25, where the device begins a subsequent transmission burst. Thus, similarly as described above, the device can receive a last weight vector in slot 8 or another slot following slot 6 based on signals from slot 6. The device and base station can hold the weight vector for multiplying signals communicated in slot 25, 26, 27, etc. to provide CLTD until a new weight vector based on signals transmitted in slot 25, and beyond, is received from the base station.

Figure 8:
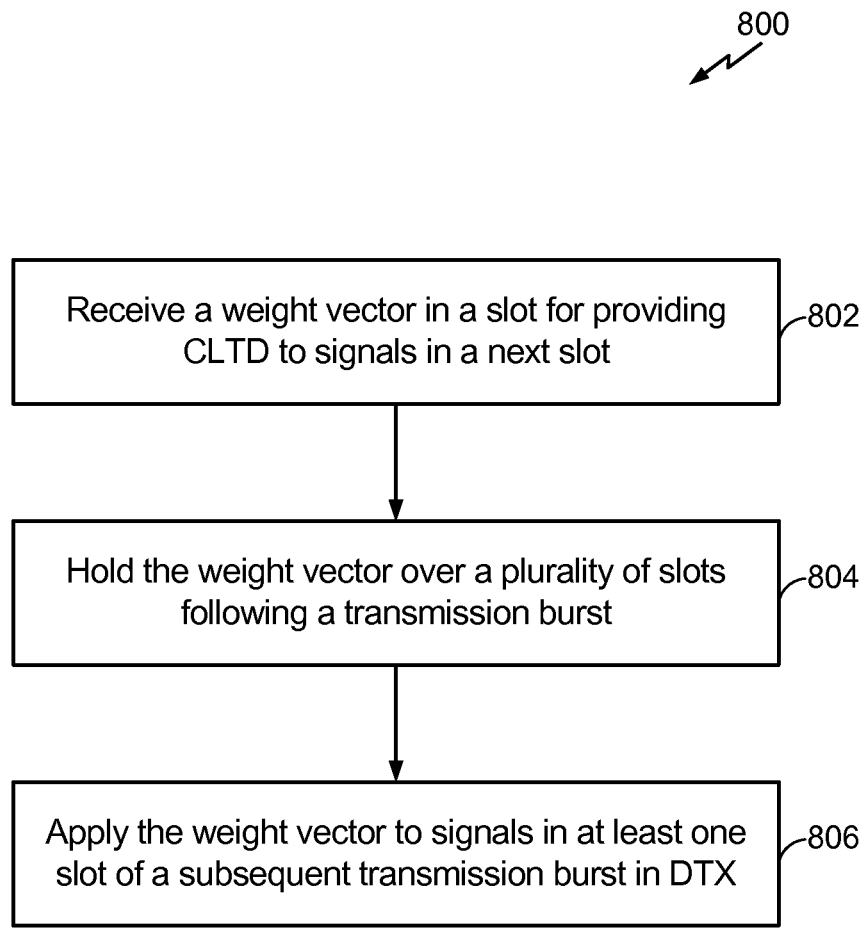
FIG. 8 is an example methodology for holding a received weight vectors.
Figure 9:
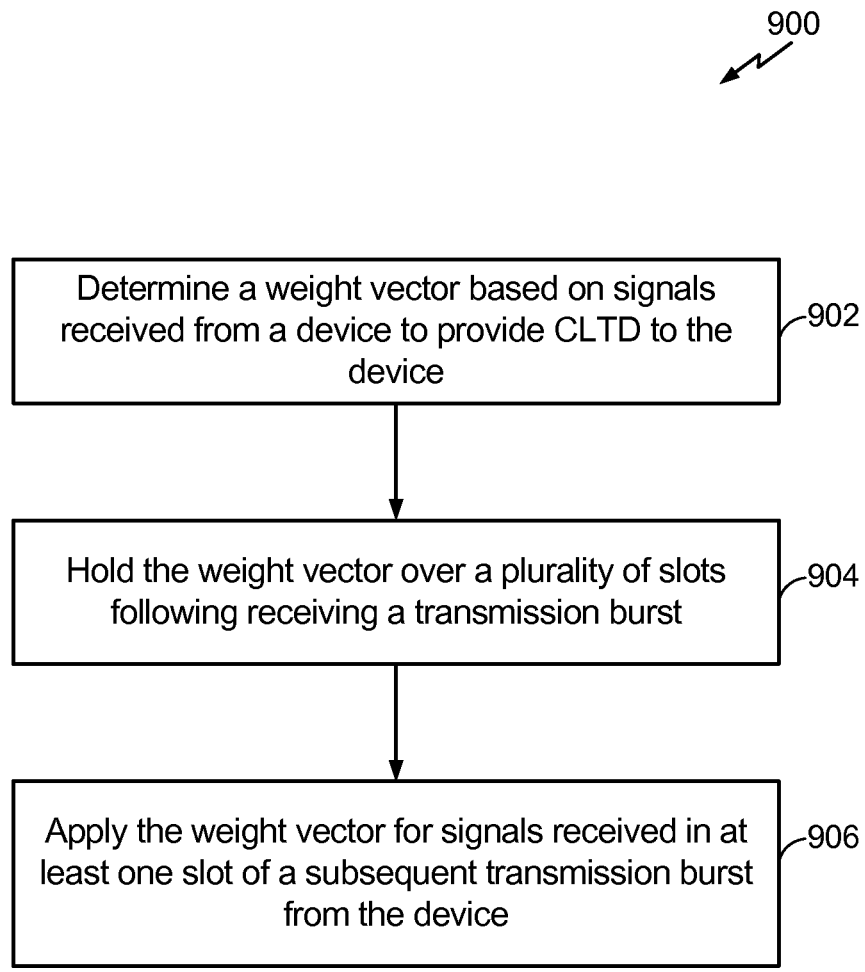
FIG. 9 is an example methodology for holding a determined weight vectors.

Referring to FIGS. 8-9, example methodologies relating to applying weight vectors for implementing CLTD are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 8 illustrates an example methodology 800 for utilizing one or more weight vectors to provide CLTD. At 802, a weight vector can be received in a slot for providing CLTD to signals in a next slot. As described, the weight vector can be computed by a base station and provided to optimize subsequent signals transmitted to the base station. The weight vector can comprise a component for each of a plurality of transmit antennas, as described. At 804, the weight vector can be held over a plurality of slots following a transmission burst. For example, the weight vector can be a last weight vector received following the transmission burst, as described. At 806, the weight vector can be applied to signals in at least one slot of a subsequent transmission burst in DTX. This can include applying individual components of the weight vector to signals to be transmitted over each of a plurality of transmit antennas. As described, a new weight vector can have not been received, and thus the previous weight vector can be applied to signals in a number of slots of the subsequent transmission burst until the new weight vector is computed and received from the base station.

FIG. 9 depicts an example methodology 900 for applying a provisioned weight vector to process signals received from a device. At 902, a weight vector based on signals received from a device can be determined to provide CLTD to the device. As described, the weight vector can have been subsequently provisioned to the device. The weight vector can comprise a component for each of a plurality of transmit antennas used by the device in CLTD, as described. At 904, the weight vector can be held over a plurality of slots following receiving a transmission burst. For example, the weight vector can be a last weight vector determined for the transmission burst. At 906, the weight vector can be applied for signals received in at least one slot of a subsequent transmission burst from the device. As described, for example, the weight vector can be applied until a new weight vector is determined from signals received in the subsequent transmission burst.

Figure 10:
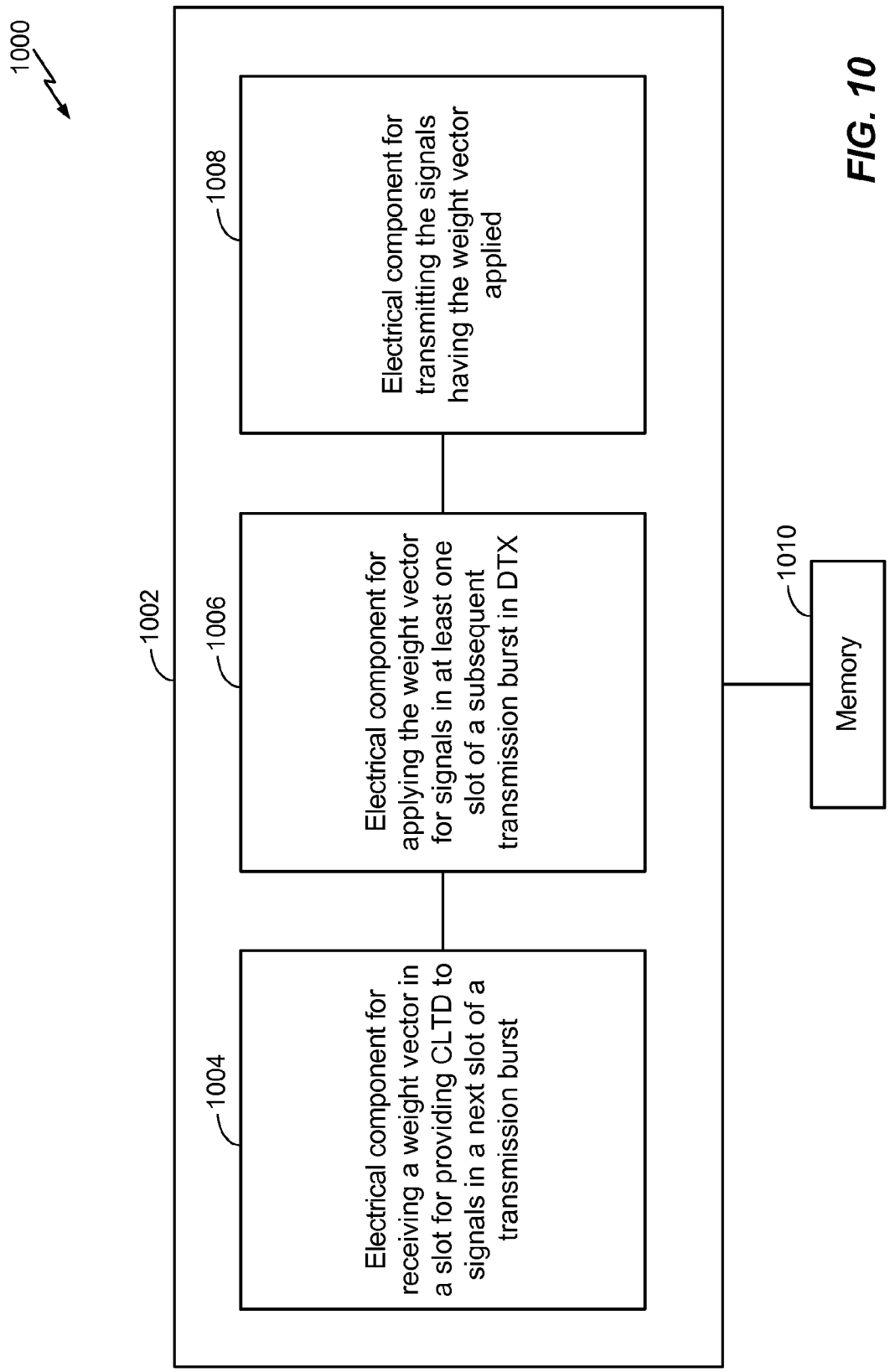
FIG. 10 is an example system that holds a received weight vectors.

FIG. 10 illustrates an example system 1000 for applying received weight vectors to signals for providing CLTD. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a weight vector in a slot for providing CLTD to signals in a next slot of a transmission burst 1004. Further, logical grouping 1002 can comprise an electrical component for applying the weight vector for signals in at least one slot of a subsequent transmission burst in DTX 1006.

In addition, electrical component 1006 can hold the weight vector for utilizing in at least a portion of slots of a subsequent transmission burst until a new weight vector is received, as described. Logical grouping 1002 can further include an electrical component for transmitting the signals having the weight vector applied 1008. Moreover, for example, electrical component 1004 may include vector receiving component 606, electrical component 1006 may include vector applying component 608, electrical component 1008 may include signal transmitting component 610, and/or the like. Additionally, system 1000 can include a memory 1010 that retains instructions for executing functions associated with the electrical components 1004, 1006, and 1008. While shown as being external to memory 1010, it is to be understood that one or more of the electrical components 1004, 1006, and 1008 can exist within memory 1010.

In one example, electrical components 1004, 1006, and 1008 can comprise at least one processor, or each electrical component 1004, 1006, or 1008 can be a corresponding module of at least one processor. Moreover, in an additional or alternative example, electrical components 1004, 1006, and 1008 can be a computer program product comprising a computer readable medium, where each electrical component 1004, 1006, or 1008 can be corresponding code.

Figure 11:
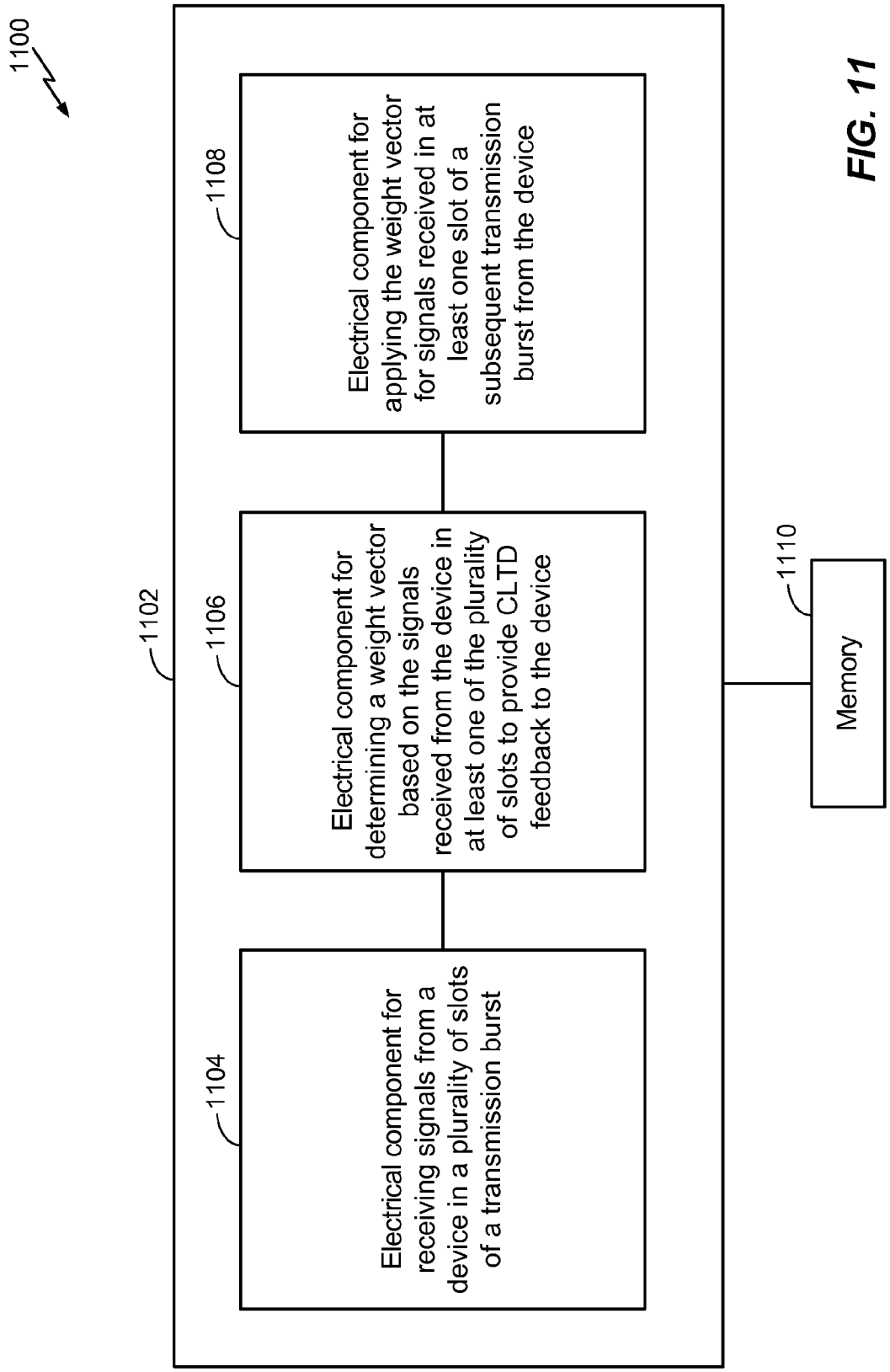
FIG. 11 is an example system that holds a determined weight vectors.

FIG. 11 illustrates an example system 1100 for determining and using weight vectors to process signals received from a device using CLTD. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving signals from a device in a plurality of slots of a transmission burst 1104. Further, logical grouping 1102 can comprise an electrical component for determining a weight vector based on the signals received from the device in at least one of the plurality of slots to provide CLTD feedback to the device 1106. For example, this can include optimizing a subsequent transmission from the device based at least in part on processing received signals, as described above.

Logical grouping 1102 can further include an electrical component for applying the weight vector for signals received in at least one slot of a subsequent transmission burst from the device 1108. In addition, electrical component 1108 can hold the weight vector for utilizing in at least a portion of slots of a subsequent transmission burst until a new weight vector is determined by electrical component 1106, as described. Moreover, for example, electrical component 1104 may include a signal receiving component 612, electrical component 1106 may include vector determining component 616, electrical component 1108 may include vector applying component 614, and/or the like. Additionally, system 1100 can include a memory 1110 that retains instructions for executing functions associated with the electrical components 1104, 1106, and 1108. While shown as being external to memory 1110, it is to be understood that one or more of the electrical components 1104, 1106, and 1108 can exist within memory 1110.

In one example, electrical components 1104, 1106, and 1108 can comprise at least one processor, or each electrical component 1104, 1106, or 1108 can be a corresponding module of at least one processor. Moreover, in an additional or alternative example, electrical components 1104, 1106, and 1108 can be a computer program product comprising a computer readable medium, where each electrical component 1104, 1106, or 1108 can be corresponding code.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating in a wireless network, comprising:
    transmitting first signals in a transmission burst in discontinuous transmission;
    in response to transmitting the first signals, receiving a weight vector in a slot for providing closed loop transmit diversity to second signals transmitted in a next slot;
    holding the weight vector over a plurality of slots following the transmission burst; and
    applying the weight vector to third signals transmitted in at least one slot of a subsequent transmission burst subsequent to the transmission burst in discontinuous transmission.

2. The method of claim 1, further comprising:
    receiving a new weight vector in another slot of the subsequent transmission burst based on fourth signals transmitted in the at least one slot; and
    applying the new weight vector to fifth signals transmitted in a subsequent slot of the subsequent transmission burst.

3. The method of claim 1, wherein the weight vector comprises components for each of a plurality of transmit antennas.

4. A computer program product, comprising:
    a non-transitory computer-readable medium comprising:
        code for transmitting first signals in a transmission burst in discontinuous transmission;
        code for, in response to transmitting the first signals, receiving a weight vector in a slot for providing closed loop transmit diversity to second signals transmitted in a next slot;
        code for holding the weight vector over a plurality of slots following the transmission burst; and
        code for applying the weight vector to third signals transmitted in at least one slot of a subsequent transmission burst subsequent to the transmission burst in discontinuous transmission.

5. The computer program product of claim 4, wherein the non-transitory computer-readable medium further comprises:
    code for receiving a new weight vector in another slot of the subsequent transmission burst based on fourth signals transmitted in the at least one slot; and
    code for applying the new weight vector to fifth signals transmitted in a subsequent slot of the subsequent transmission burst.

6. The computer program product of claim 4, wherein the weight vector comprises components for each of a plurality of transmit antennas.

7. An apparatus for high speed packet access, comprising:
    at least one processor; and
    a memory coupled to the at least one processor, wherein the at least one processor is configured to:
        transmit first signals in a transmission burst in discontinuous transmission;
        in response to transmitting the first signals, receive a weight vector in a slot for providing closed loop transmit diversity to second signals transmitted in a next slot;
        hold the weight vector over a plurality of slots following the transmission burst; and
        apply the weight vector to third signals transmitted in at least one slot of a subsequent transmission burst subsequent to the transmission burst in discontinuous transmission.

8. The apparatus of claim 7, wherein the at least one processor is further configured to:
    receive a new weight vector in another slot of the subsequent transmission burst based on fourth signals transmitted in the at least one slot; and
    apply the new weight vector to fifth signals transmitted in a subsequent slot of the subsequent transmission burst.

9. The apparatus of claim 7, wherein the weight vector comprises components for each of a plurality of transmit antennas.

10. An apparatus operable in a wireless communication system, the apparatus comprising:
    means for transmitting first signals in a transmission burst in discontinuous transmission;
    means for, in response to transmitting the first signals, receiving a weight vector in a slot for providing closed loop transmit diversity to second signals transmitted in a next slot of the transmission burst;
    means for applying the weight vector for third signals transmitted in at least one slot of a subsequent transmission burst subsequent to the transmission burst in discontinuous transmission, wherein the means for applying holds the weight vector over a plurality of slots following the transmission burst; and
    means for transmitting the third signals having the weight vector applied.

11. The apparatus of claim 10, wherein the means for receiving receives a new weight vector in another slot of the subsequent transmission burst based on fourth signals transmitted in the at least one slot, and the means for applying applies the new weight vector for fifth signals transmitted in at least one different slot of the subsequent transmission burst in discontinuous transmit.

12. The apparatus of claim 10, wherein the weight vector comprises components for each of a plurality of transmit antennas.

13. A method for communicating in a wireless network, comprising:
    receiving first signals from a device, wherein the first signals are transmitted in a transmission burst in discontinuous transmission;

determining a weight vector based on the first signals to provide closed loop transmit diversity feedback to the device;

holding the weight vector over a plurality of slots following receiving the transmission burst from the device; and applying the weight vector to second signals received from the device in at least one slot of a subsequent transmission burst subsequent to the transmission burst in discontinuous transmission.

14. The method of claim 13, further comprising:

determining a new weight vector based on third signals received from the device in the at least one slot; and applying the new weight vector to fourth signals received from the device in a subsequent slot of the subsequent transmission burst.

15. The method of claim 13, further comprising provisioning the weight vector to the device.

16. A computer program product, comprising:

a non-transitory computer-readable medium comprising:

code for receiving first signals from a device, wherein the first signals are transmitted in a transmission burst in discontinuous transmission;

code for determining a weight vector based on the first signals to provide closed loop transmit diversity feedback to the device;

code for holding the weight vector over a plurality of slots following receiving the transmission burst from the device; and code for applying the weight vector to second signals received from the device in at least one slot of a subsequent transmission burst subsequent to the transmission burst in discontinuous transmission.

17. The computer program product of claim 16, wherein the non-transitory computer-readable medium further comprises:

code for determining a new weight vector based on third signals received from the device in the at least one slot; and code for applying the new weight vector to fourth signals received from the device in a subsequent slot of the subsequent transmission burst.

18. The computer program product of claim 16, wherein the non-transitory computer-readable medium further comprises code for provisioning the weight vector to the device.

19. An apparatus for high speed packet access, comprising:

at least one processor; and a memory coupled to the at least one processor, wherein the at least one processor is configured to:

receive first signals from a device, wherein the first signals are transmitted in a transmission burst in discontinuous transmission;

determine a weight vector based on the first signals to provide closed loop transmit diversity feedback to the device;

hold the weight vector over a plurality of slots following receiving the transmission burst from the device; and apply the weight vector to second signals received from the device in at least one slot of a subsequent transmission burst subsequent to the transmission burst in discontinuous transmission.

20. The apparatus of claim 19, wherein the at least one processor is further configured to:

determine a new weight vector based on third signals received from the device in the at least one slot; and apply the new weight vector to fourth signals received from the device in a subsequent slot of the subsequent transmission burst.

21. The apparatus of claim 20, wherein the at least one processor is further configured to provision the weight vector to the device.

22. An apparatus operable in a wireless communication system, the apparatus comprising:

means for receiving first signals from a device in a plurality of slots related to a transmission burst in discontinuous transmission;

means for determining a weight vector based on the first signals to provide closed loop transmit diversity feedback to the device; and means for applying the weight vector for second signals received from the device in at least one slot of a subsequent transmission burst subsequent to the transmission burst in discontinuous transmission, wherein the means for applying holds the weight vector over a different plurality of slots following the transmission burst.

23. The apparatus of claim 22, wherein the means for determining determines a new weight vector based on third signals received from the device in the at least one slot, and the means for applying applies the new weight vector to fourth signals in a subsequent slot of the subsequent transmission burst.

24. The apparatus of claim 22, further comprising means for provisioning the weight vector to the device.

* * * * *